United States Patent [19]

Zaugg

[11] 4,226,471
[45] Oct. 7, 1980

[54] ASSEMBLY TRANSFORMABLE INTO FURNITURE

[76] Inventor: Ernst Zaugg, Luegisland, Oberlangenegg, CH-3611 Süderen, Switzerland

[21] Appl. No.: 29,032

[22] Filed: Apr. 11, 1979

[30] Foreign Application Priority Data

Apr. 14, 1978 [CH] Switzerland .......................... 3993/78

[51] Int. Cl.² .............................................. A47C 13/00
[52] U.S. Cl. .................................... 297/118; 297/157; 297/44; 108/14; 224/328
[58] Field of Search ............... 297/118, 119, 157, 158, 297/440, 139; 108/11, 14; 190/12 A, 12 R; 224/309, 328; 182/178

[56] References Cited

U.S. PATENT DOCUMENTS

| | | | |
|---|---|---|---|
| 971,342 | 9/1910 | Balentine | 297/440 |
| 2,642,123 | 6/1953 | Borns | 108/14 X |
| 2,948,576 | 8/1960 | Ball | 224/328 |
| 2,965,424 | 12/1960 | Baney | 108/14 |
| 3,095,129 | 6/1963 | Kerr | 224/328 |
| 3,101,061 | 8/1963 | Amend | 297/157 X |

FOREIGN PATENT DOCUMENTS

| | | | |
|---|---|---|---|
| 315103 | 9/1956 | Switzerland | 297/139 |
| 920226 | 3/1963 | United Kingdom | 297/157 |

Primary Examiner—Francis K. Zugel
Attorney, Agent, or Firm—Ernest F. Marmorek

[57] ABSTRACT

An assembly adapted for transport on a vehicle may be transformed into furniture; the furniture includes at least a table, and a bench. The assembly consists of a frame, including a plurality of tubular elements which may be assembled one to another, to form carrying elements of the table and the bench of the furniture, and of a transport case, including a cover member therefor doubling as a table top of the table, and first and second groups of plates forming a floor member of the case; the first group of plates double as a backrest of the bench, and the second group of plates double as a sitting portion of the bench.

23 Claims, 13 Drawing Figures

ASSEMBLY TRANSFORMABLE INTO FURNITURE

BACKGROUND OF THE INVENTION

From German Patent No. DE-OS 26 47891, there is known a collapsible table and sitting combination with a table and at least one seat or bench, which may be collapsed into a suitcase, where the suitcase can then be closed. All construction parts are coupled together by hinges.

It has been shown, however, that the use of hinges on furniture leads to accidents, children being particularly exposed to such risks.

This arrangement, consisting of a plurality of parts, requires a surface which is more or less horizontal and even, on which these construction parts formed of triangular blocks can be put. The table and the sitting portions form respective surfaces parallel to one another.

As a result of the particular implementation, where all the parts are connected together, the distances of the table and the sitting portions are invariant.

Any load exerted on the table or onto one of the sitting portions is transferred to the whole mechanism. The hinges, particularly those of the backrest of the sitting parts, are unduly stressed.

This implementation has considerable disadvantages, which influence the stability, rigidity and comfort of the arrangement when being used.

SUMMARY OF THE INVENTION

It is accordingly an object of the present invention to obviate these disadvantages, and to create a table and sitting combination, which can be easily assembled or disassembled, without requiring any expert personnel.

It is further an object of the present invention for the assembly, which may be secured to the top of the vehicle, to receive other objects, and be protected from any external influences, such as rain, snow, dust, etc.

The objects are attained by providing an assembly adapted for transport on a vehicle and transformable into furniture, the furniture including at least a table, and a bench, which comprise a frame, including a plurality of tubular elements which may be assembled one to another, to form carrying elements of the table and the bench of furniture, and a transport case, including a cover member therefor doubling as a table top of the table, and first and second groups forming a floor member of the case, the first group of plates doubling as a backrest of the bench, the second group of plates doubling as a sitting portion of the bench.

It is advantageous if the tubular elements comprise first and second groups of elements, elements of the first group being arranged to telescope within corresponding elements of the second group, respectively.

It is preferable if the frame has at least four corner portions releasably connectable to the vehicle, and wherein the tubular elements include at least four crossbars, two crossbars each releasably linking two respective corner portions to one another, so as to form respective frame end-portions, and two connecting bars for releasably linking the frame end-portions to one another.

It is advantageous if the corner portions, the crossbars, and the connecting bars define a plane extending substantially in parallel to the floor.

It is preferable if each corner portion comprises a longitudinal strut and outer and inner cross-struts secured to the longitudinal strut near respective end portions thereof.

It is also advantageous if the outer cross-strut has a length exceeding the length of the inner cross-strut.

It is preferable if the inner width of each strut exceeds the outer width of the bars.

It is advantageous if each cross-strut has at least one aperture near its ends, and if the aperture communicates with a threaded bore in a corresponding cross-strut.

In one version of the invention, the aperture is a through-going hole. In another version of the invention, the aperture is a slot extending along the longitudinal axis of the cross-strut.

It is preferable if each longitudinal strut has at least one aperture near its free end, and if each connecting bar is formed with at least one threaded bore near each of its ends, and if the aperture in the longitudinal strut communicates with a threaded bore in a corresponding connecting bar.

In one version of the invention, the aperture in the longitudinal strut in a through-going hole; and in another version of the invention, the aperture in the longitudinal strut extends along the longitudinal axis of the longitudinal strut.

It is advantageous if additional apertures are provided in each bar, and if each additional aperture is offset by about 90° on the periphery of a corresponding bar from an adjoining aperture, and if the apertures are spaced at respective predetermined distances from one another along the longitudinal direction of the corresponding bar.

It is also advantageous if the plates comprise pairs of plates of substantially equal dimensions.

In one version of the invention, the plates comprise two outer plates and up to four inner plates; and in another version of the invention, the plates comprise at least two pairs of outer plates and one pair of inner plates.

It is advantageous if each inner plate has a thickness exceeding the thickness of each outer plate.

In one version of the invention, the furniture preferably includes an additional bench, the outer pair of plates double as sitting portions, and the inner pair of plates double as the backrests of the benches, respectively.

In another version of the invention, the furniture includes an additional bench, and the outer plates double as the backrest, and the inner plates double as the sitting portions of the benches, respectively.

It is preferable if at least one member of the transport case is formed with an outer rim on a lower side thereof, and has an endless groove spaced at a predetermined distance from the outer rim.

In one version of the invention, the transport case includes a third group of plates forming walls thereof, and the floor member has a plurality of grooves, the third group of plates being insertable into the grooves, respectively.

In another version of the invention, the transport case includes a third group of plates forming walls thereof, and further includes a plurality of pins extending towards the members of the case, and wherein the floor member and the cover member have holes for receiving the pins, respectively.

BRIEF DESCRIPTION OF THE DRAWINGS

For a fuller understanding of the nature and the objects of the invention, reference should be had to the following detailed decription, taken in conjunction with the accompanying drawings, in which.

DESCRIPTION OF THE PREFERRED EMBODIMENTS

Figure 1:
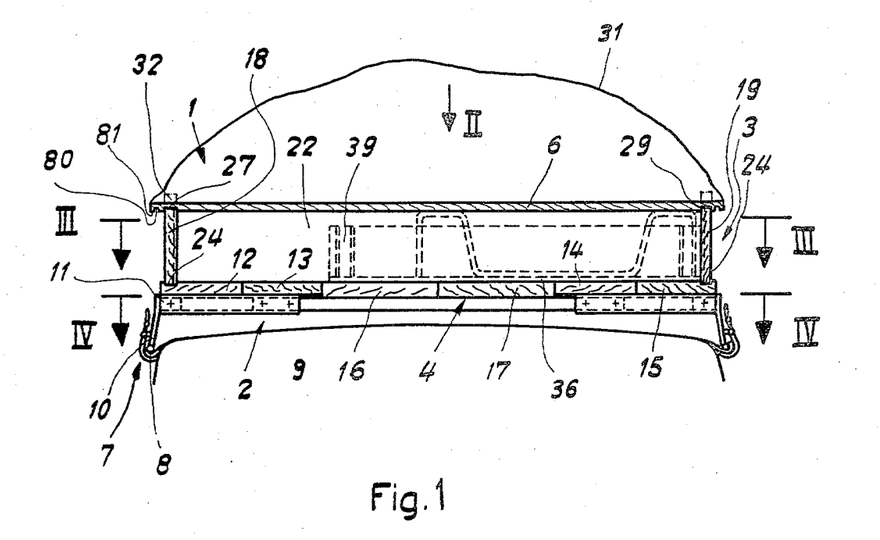
FIG. 1 shows an elevational view of the assembly disposed on an automobile.

A transport mechanism 1, as shown in FIG. 1, includes a frame 2, and a transport case or chest 3, which is closed on all sides by a floor 4, by side walls 5, and by a cover 6, which cover doubles as a table top of a table. The frame 2 is connected by means of known clamps 7 to gutters 8 on the roof 9 of an automobile. Each supporting element 10, to which clamps 5 are secured, includes on its upper end a pin 11, which is inserted into the frame 2. The pin 11 is preferably welded to a supporting element 10 of the clamps 7. A holding device of this type is secured to all the four corners of the frame 2. The frame 2 is secured to the vehicle by means of a clamping arrangement, which will be described in some embodiments of the invention later.

The transport case or chest 3, whose floor consists of three pairs of equally-dimensioned plates of wood, metal or plastic, is disposed on the frame 2. Outer plates 12 through 15 double as the sitting surfaces of two benches, while inner plates 16 and 17 double as the backrests of these benches.

If the width of the individual plates forming this floor of the transport case 3 is changed, it is of course possible to utilize the outer plates, respectively, as backrests of the bench, while two or four inner and relatively thicker plates disposed between these outer plates can be used as sitting surfaces.

Figure 2:
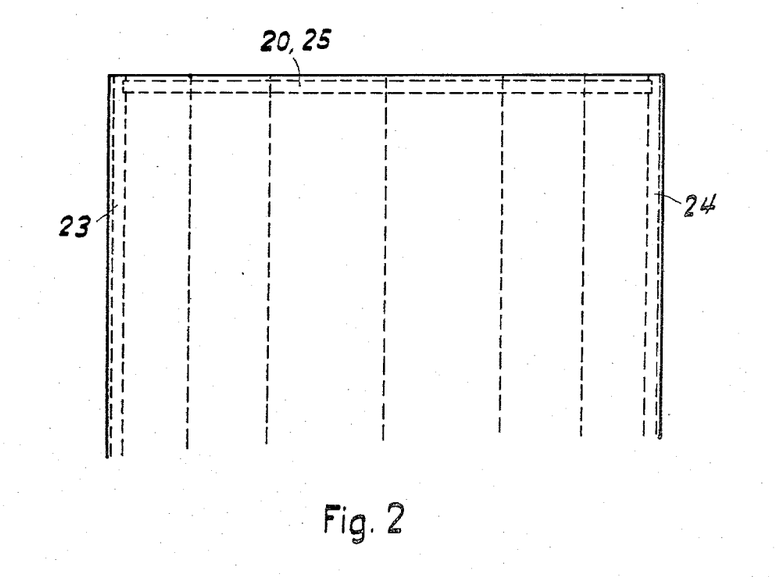
FIG. 2 is a partial plan view of the assembly according to FIG. 1.

An inner space 22 of the transport chest 3 is defined or delineated by a frame including two pairs of plates 18 and 19, on one hand, and plates 20 and 21, on the other hand, of substantially equal dimensions. The outer plates 12 and 15 of the floor 4 are formed with longitudinal grooves 23 and 24, respectively, which extend over the rim of the whole length of the plates 12 and 15, and into which grooves 23 and 24, the plates 18 and 19 of the transport case 3 are inserted respectively. In order to firm up the frame, there are inserted a front plate 20 and a rear plate 21, the rear plate 21 not being shown in FIG. 2, between the lateral walls 18 and 19, in a direction transverse to the direction of motion of the vehicle.

For this purpose, the plates 12 through 17, which form the floor 4 of the transport case 3, are formed in the region of their end portions with lateral grooves 25 and 26 (the groove 26 not being shown in FIG. 2), in which grooves 25 and 26, there are inserted the front plate 20 and the rear plate 21, respectively. The upper rim of the side walls 18–21 defines a plane parallel to the floor 4, of the transport case 3. A cover plate 6, which can be utilized as a top of a table, and which is formed on its periphery with grooves 27 through 30, serves to close the transport case 3. The grooves 23 to 30 simultaneously serve to shape and stabilize the transport case 3, and protect any objects therewithin from any undesired external influences, such as rain, snow, or dirt.

Elements other than the grooves can also be utilized to secure the plates 18 through 21 to the floor 4. These elements may be pins, which are firmly anchored to, and project from, edges of the plates 18 through 21, and which are inserted into corresponding holes in the floor 4 and the cover 6, when the transport case 3 is assembled. To prevent the holes in the floor of the cover of the transport chest 3 from being unnecessarily widened, dowel-like sleeves, made preferably of plastic or metal, are preferably inserted therein, prior to assembly of the transport case 3.

To prevent rainwater from penetrating into the transport case 3, the outer plates 12 and 15 of the floor 4, and the cover 6 are formed in the region of their respective rims with a spout, formed by a groove 80, bordered by a downwardly projecting rim 81.

The parts, which form the transport case 3, are held together with the aid of clamps, snap-in closure means, straps, or the like. The cover plate 6 of the transport chest 3 is utilized during transport as an additional carrying surface for other equipment portions, like a tent, tent poles, camping accessories, and various other trusses. The cover plate 3 has the further advantage that any small objects will no longer fall, as has been the case up to now, through the frame to the roof of the vehicle, but are supported by a full-sized floor.

The cover plate 6 is advantageously formed with an upwardly protruding rim 32 of a minimal height, which prevents the sliding off of any objects from the cover 3.

As has been shown in FIG. 1, the objects disposed on the cover plate 6 are covered with a tarpolin or the like.

Figure 3:
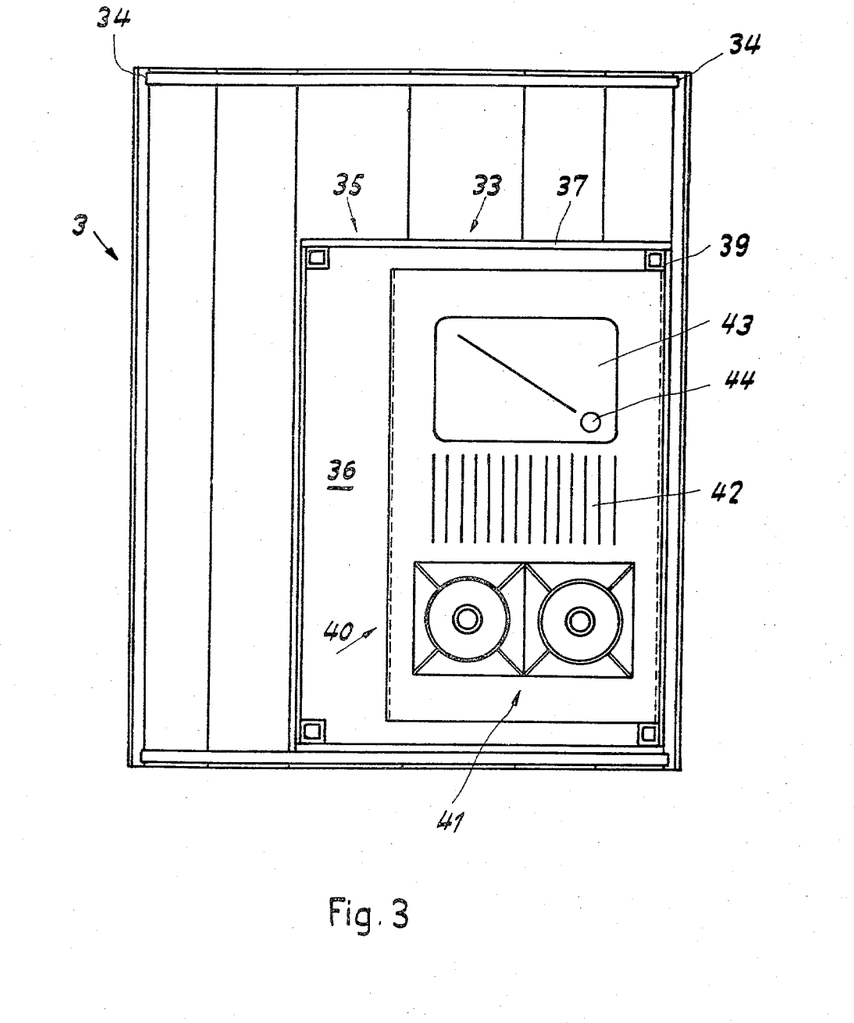
FIG. 3 is a horizontal section through the assembly along lines III—III of FIG. 1.

FIG. 3 shows the implementation of the inner space 22 of the transport chest 3, in which a support 33 of the table is loosely disposed. This figure also shows the contour of the transport chest 3 in a plan view, the arrangement of the side walls showing its particular stability.

The side walls, which are disposed in the direction of transport, are preferably formed at their ends with vertically disposed grooves 34, into which grooves 34 project the front side and rear side of the transport case 3, respectively, which arrangement increases the stability of the transport assembly 1.

The table base or support 33 consists of a frame 35, with a cover 36, whose structure will be described later. Each corner of the table support 33 is formed from respective walls 37 and 38, and contains a tubular support 39, which preferably has either a rectangular or round cross-section. The supports 39 are covered on one side by the cover 36. The implementation and formation of the table support 33 is such that it uses as little room as needed during transport. Within the table support 33, turned downwardly together with the cover 36, there is disposed a combined kitchen arrangement 40, consisting of a heating arrangement 41, and an equipment-support or drain surface 42, as well as a washing basin 43, with an outlet 44. The kitchen arrangement 40 may, for example, be supported during use by four supporting legs resting on the floor, which supporting legs are stored in the transport case 3 during transport.

Figure 4:
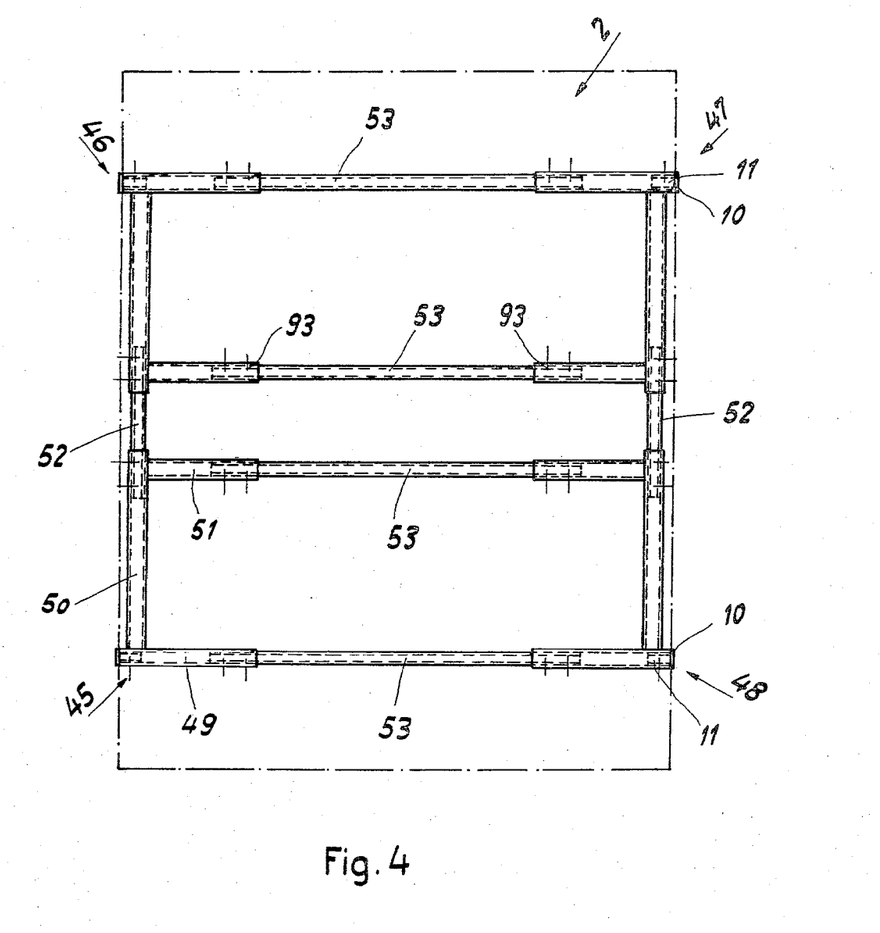
FIG. 4 is a horizontal section of the assembly across lines IV—IV of FIG. 1.

According to FIG. 4, the frame 2 is assembled from several tubular elements or construction parts, assembled or secured to one another by means of appropriate clamping arrangements, which double as carrying elements of the table or bench. The construction parts 45 to 48 form the basic element of the frame 2. They consist each of an outer cross-strut 49, and a longitudinal strut 50, and additionally include an inner cross-strut 51, disposed in a location nearer the center of the frame 2, and extending parallel to the cross-strut 49.

Each assembly of three of the struts, forming respective corner portions of the frame, is preferably welded together, the struts having preferably a rectangular or quadratic tubular cross-section for simplicity in use. Into each of the two longitudinal struts 50, there is telescopically inserted a connecting bar 52, having a smaller cross-section, the connecting bar 52 being preferably also of tubular form, so that two frame-end portions are connected by two connecting bars. Furthermore, all the cross-struts 49 and 51, forming respective corner portions with the longitudinal strut 50, are connected to one another by means of tubular crossbars 53. These crossbars 53 are telescopically inserted into the cross-struts 49 and 51, so that the frame 2 may be tailored as best as possible to each vehicle; the tubular crossbars 53, formed as connecting pieces, may be used in different lengths.

The contour of the transport case 3 is shown by dash-dot lines in FIG. 4. Furthermore, on the corner portions of the frame 2, one can observe the supporting element 10 of the clamping arrangement 7, which is connected to the pin 11.

Figure 5:
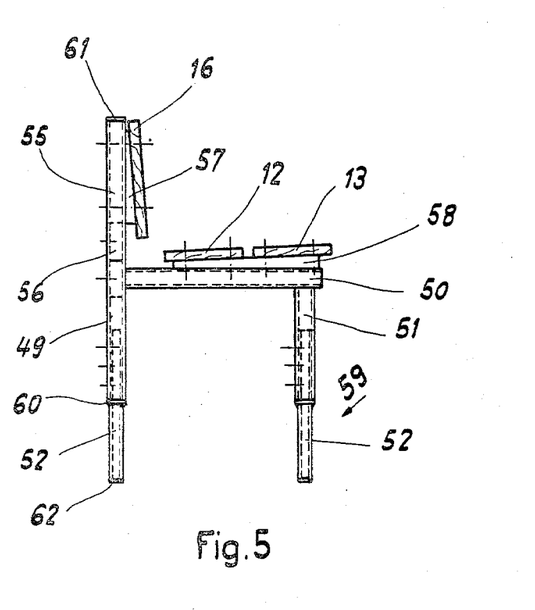
FIG. 5 is a side view of a bench, assembled from portions of the assembly.
Figure 6:
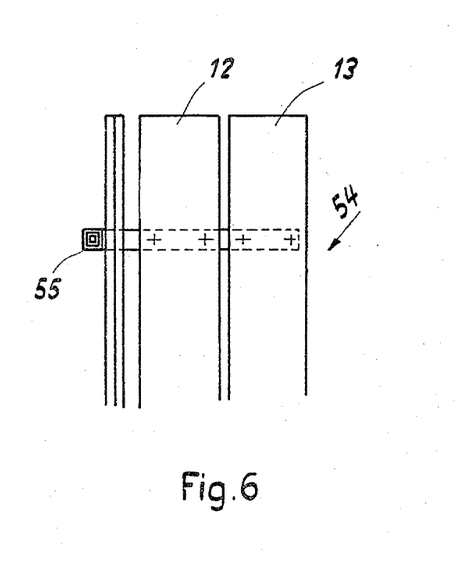
FIG. 6 is a partial plan view of the bench of FIG. 5.

FIG. 5 shows a bench 54, constructed from the modular or construction parts 45, 46, and 52 of the frame 2, and from the plates 12, 13, and 16 of the floor 4 of the transport case 3. In order to secure the backrest 16 to the bench, there are required additionally two extension pieces 55, which are formed at their lower end with a telescopically inserted tubular rod 56. The rod 56 is preferably welded to the extension element 55. In order to increase sitting comfort, a wedge-shaped support 57 is clamped in between the extension element 55 and the backrest 16, so as to make the backrest 16 inclined. Lock nuts having a lenticular head and a butterfly nut are preferably used on the rear side of the bench. The extension element 55 may, of course, be provided with a thread for receiving a screw.

In order to provide the bench with the required stability, it is unavoidable to provide the backrest 16 with at least two screw connections per extension element 55. As such a screw connection is time-consuming when the bench is assembled, an alternative embodiment will therefore be described. Instead of the two lock nuts per extension element 55, there are inserted two bolts 16 into the backrest, which, upon being assembled, pass through the wedge-shaped support 56, and the immediately adjoining wall of the extension element 55. Between these bolts 16, there is inserted in the backrest 16, another bolt, which exceeds the bolts 16 in length, and which is threaded on the end projecting from the rear of the backrest.

This elongated threaded bolt passes through the wedge-shaped support 57, and the extension element 55 in such a manner that a nut can be received by the so projecting thread, for example, a nut formed as a knob covered by plastic material.

The securing of the plates 12 and 13 to the sitting surfaces is accomplished in a similar manner. A wedge 58, inserted between the plates 12 and 13 on one hand, and the longitudinal strut 50, increases sitting comfort. Furthermore, the use of two plates 12 and 13, instead of a single plate, also increases sitting comfort. The plates 12 and 13 are secured to the struts 50 in a manner similar to the arrangement of the backrest 16.

The connecting bars 52 of the frame 2 are used as supporting legs 59 of the bench 54. In order to form two benches from the available constructional or modular parts, there are needed an additional six connecting bars 52, which can then be stored during transport in the inner space 22 of the transport case 3. In order not to stress the bolts which secure the furniture and the frame unduly, the connecting bar 52 is provided with a shoulder 60, which takes over the load exerted on the benches.

In order, however, to make the benches height-adjustable to several levels of height, if necessary only a single shoulder 60 can be provided on the connecting bar 52. For this case, several apertures are provided in the connecting bar 52, as will be described in detail later.

These apertures serve to tailor the frame 2 to the dimensions on the roof of respective different vehicles.

Both the upper ends of the extension element 55, as well as the end of the connecting bar 52 facing the floor, can be provided with respective cover plates 61 and 62. The cover plate 61 advantageously prevents any premature corrosion in the interior of the tube, while the cover plate 62 at the end of the connecting bar 52 facing the floor reduces any sinking-in of the bench into the ground.

Instead of manufacturing additional connecting bars 52, the cross-struts 49 and 51 of the frame 2 may be of relatively greater length, or what is the equivalent, the connecting bars 52 may be dispensed with, when assembling the benches. In such a case, a height adjustment of the sitting surface of the bench is then, however, no longer possible. Also, the sitting surface may not then, in the event of any uneven grond, be aligned along a horizontal plane.

Figure 7:
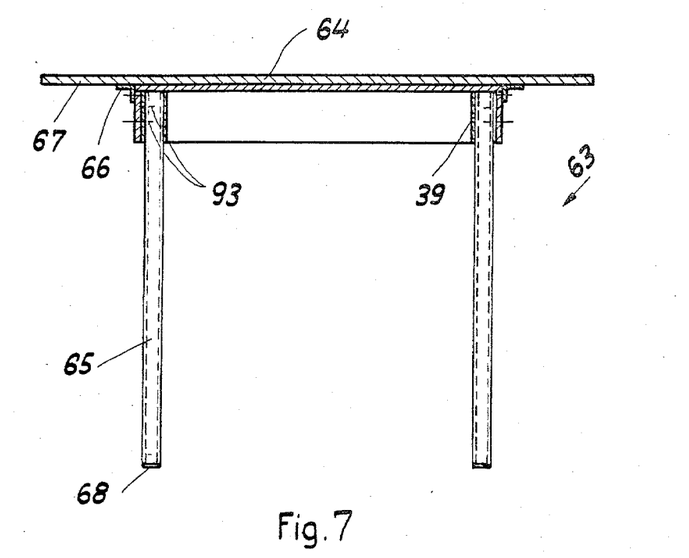
FIG. 7 is a side view of a table assembled from portions of the assembly.
Figure 8:
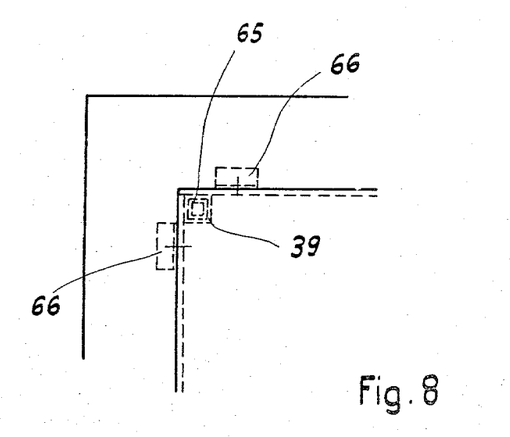
FIG. 8 is a partial plan view of the table according to FIG. 7.

From FIGS. 7 and 8, one can see the assembled table 63, disposed in the space 22 of the transport case 3, which has been assembled from the table support 33, from the cover 6, as well as from the bars 53. This table has a critical advantage with respect to a conventional implementation, for it has all the properties normally associated with a conventional table, even though it is used for camping. A table cover 64 of the cover 6 of the transport case 3 provides a large working surface. Furthermore, due to the normal height of 75 to 80 centimeters of the table, a user avoids impacting his knee on the lower side of the table top when he gets up. Furthermore, as a result of its robust implementation, the table has a high degree of stability. The bars 53 of the frame 2, used as the legs 65 of the table, are inserted into the tubular supports 39 of the table base 33. At their lower ends, the legs 65 of the table are provided with cover plates 68, which, as in the case of the bench, prevent sinking-in of the legs into the ground.

The cover 36 limits the depth of penetration of the bars 53, and therefore the height of the table 63. It is of course possible to extend the tubes 39, so that a height adjustment of the table is possible. The length of the tubes 39 may not, however, exceed the inner height of the transport case 3, exclusive of the cover 36 of the table base 33, for otherwise the table base 33 would not have any room in the inner space 22 of the transport case 3. Thus, disassembly of the tubes 39 from the table base 33 would have to be considered, in the event the table is required to be adjustable within a relatively large height range.

Holes 93, disposed at regular or irregular distances along the bars 53, in addition to making height adjustment of the table possible, also permit appropriate dimensioning of the assembly for transporting the assembly in the vehicle. The bars 53 are preferably provided at each respective end with apertures or holes 93, so that connecting bolts can be passed therethrough. In order to increase adjustability, the holes 93 are disposed on the periphery of the bar 53, and are displaced from one another at equal or unequal distances.

So that the table top is not displaced during use of the base 33, there are secured at least two shoulders 66 to the lower side 67 of the table top. Furthermore, the connecting bolts prevent tipping of the table top from the table base 33. These securing arrangements are illustrated in FIGS. 7 and 8.

Figures 9, 10:
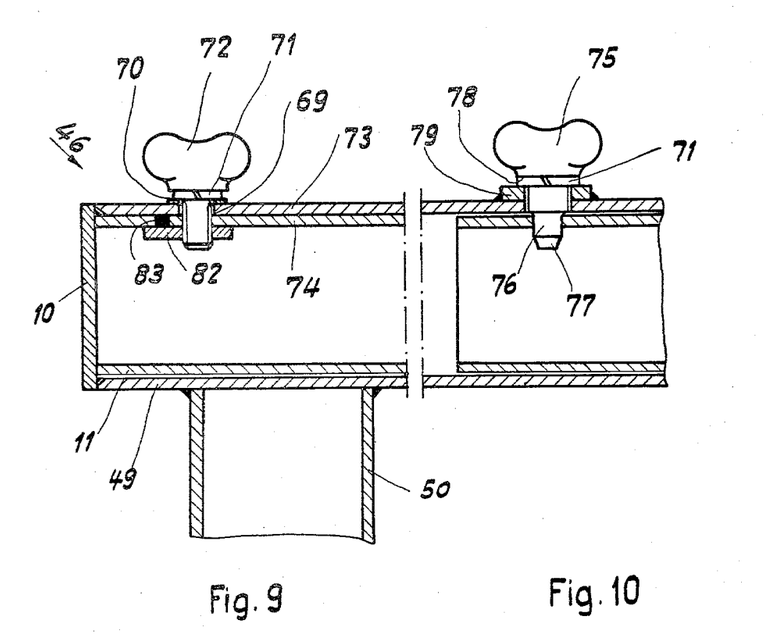
FIG. 9 is an enlarged view of a portion of FIG. 4, the detail of the left upper corner of the frame being shown in cross section.
FIG. 10 is another version for preventing one portion inserted into another portion of the frame, for sliding with respect to one another.
Figure 11:
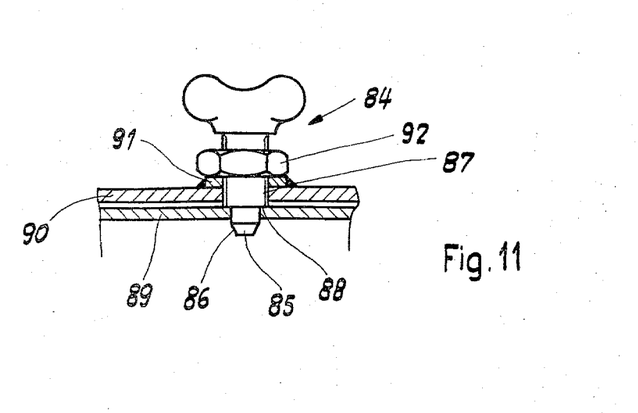
FIG. 11 is a variation of the embodiments of FIG. 9 and FIG. 10.

FIGS. 9 to 11 show alternatives for assembling the frame construction parts together, one part being telescopically inserted into another part.

To prevent any unnecessary noise emanating from the frame, and also in order to endow the transport arrangement with optimal stability, those elements or construction parts of the frame telescopically fitting into other construction parts should be fabricated with as little play as possible.

FIG. 9 illustrates the front left edge of the frame 2, and the rigid connection of the portion 46 of the frame with respect to the vehicle. A supporting element 10 of the clamping arrangement 7 is preferably welded to the pin 11, and inserted into the cross-strut 49 of the construction part 46. The pin 11 is provided with a thread, onto which there is screwed a butterfly wing screw 72, the pin 11 passing through a hole 69 in the cross-strut 49, there being interposed a support disc 70 and a spring washer 71. The butterfly wing screw 72 draws the side flanges 73 and 74 of the parts telescopically inserted into one another together, the friction occurring between the surfaces pressed to one another insuring that these parts do not slide with respect to one another.

It is advantageous to create at least two such connecting locations per each corner portion of the frame. In order to use as light a material as possible for the frame, which requires that the tubes used have thin walls, one faces the risk that the threads used may be torn apart when the elements or constructional parts are drawn together. For this reason, in the implementation according to FIG. 9, in the region of the clamping arrangement, a plate 82 can be welded to the pin 11 on the inner wall of the inner tube. Because the inner wall of the tube is not accessible for welding purposes, there is drilled, as is known per se, a hole 83 within the region of plate 82. Subsequently, the plate 82 is held by a separate arrangement towards the inner wall of the tube, and the hole 83 is filled from its exterior with welding material, which then connects the two parts. This securing arrangement of the elements or constructional parts, where one part fits into another telescopically, can be adopted throughout the entire frame, and can be made use of when adjusting the height of the table and the bench.

This applies also to the connecting bars 52 and the longitudinal struts 50 of the frame. In order to better distribute the load exerted on the passage holes by bearing pressure, as well as the stress exerted on the threads, and the threaded bolts of the butterfly nut, the aforesaid locking arrangements are displaced with respect to one another.

In the implementation example according to FIG. 10, the front end of the threaded bolt of the butterfly wing screw 75 is stripped of a thread, resulting in a thread-free bolt portion 76. Its end point has a conical portion 77, so that the bolt 76 may be inserted into the slightly larger passage 78, but substantially without any play. This locking arrangement does not, however, prevent any to-and fro- motion of the construction parts along the longitudinal axis of the screw. This is, however, prevented almost completely by a second locking arrangement.

Instead of passage holes or apertures, one can also utilize slots, which extend along the longitudinal axis of the parts locked to one another.

To secure the butterfly wing nut, there is used a spring washer or similar securing element between the shoulder 78 of the butterfly wing nut, and the plate 79, the plate 79 being used to reinforce the constructional parts of the frame.

In FIG. 11, there is shown an additional form of clamping arrangement, in which play between the elements or constructional parts is avoided entirely. A bolt 85 is disposed on the front end of the butterfly nut 84, which terminates in a conical chamfer or bevel. The bolt 85 and the thread 87 of the butterfly wing nut form, at their intersection, a shoulder 88, which presses the inner construction part 89 against the oppositely disposed inner wall of the outer element or construction part 90. The bolt 85 of the butterfly nut prevents displacement of the constructional parts along their longitudinal axis. So that a sufficient clamping force is exerted between the constructional parts, the inner thread is extended by a plate 91, welded to an outer wall of the outer constructional portion 90, which portion has therefore also been reinforced. A counter-nut 92 secures the clamping arrangement and prevents the release thereof.

In order to release the loading of the butterfly wing nut, and in order to also reduce the bearing pressure on the clamping arrangement, it is possible to pass the bolts 76 and 85 of the FIGS. 10 and 11, respectively, through the respective construction parts or elements.

Figure 12:
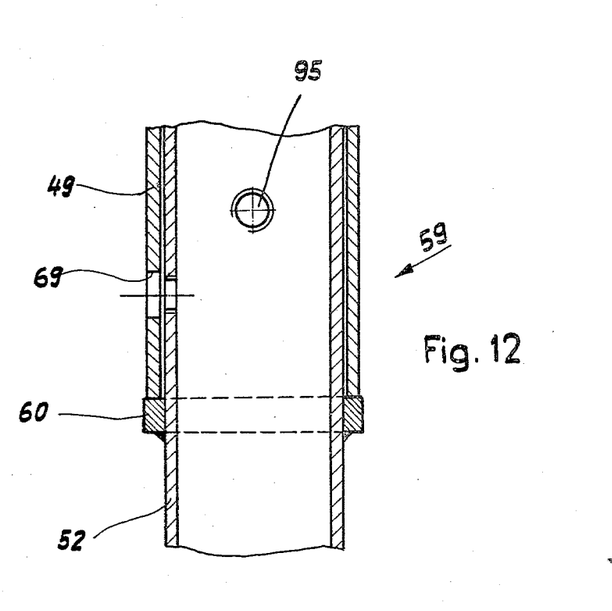
FIG. 12 is a partial longitudinal section through a leg of the bench.

FIG. 12 shows a further example of how the table and the bench are adjustable in height. In addition to employing a shoulder 60 on the periphery of the connecting rod 52, several threaded holes 95 are disposed on the periphery of the connecting rod 52, and are displaced by respective angles of 90°.

It is thereby possible to adjust the height of the furniture to a desired height without any special arrangement, and also to tailor the furniture to any peculiarities of the floor.

Figure 13:
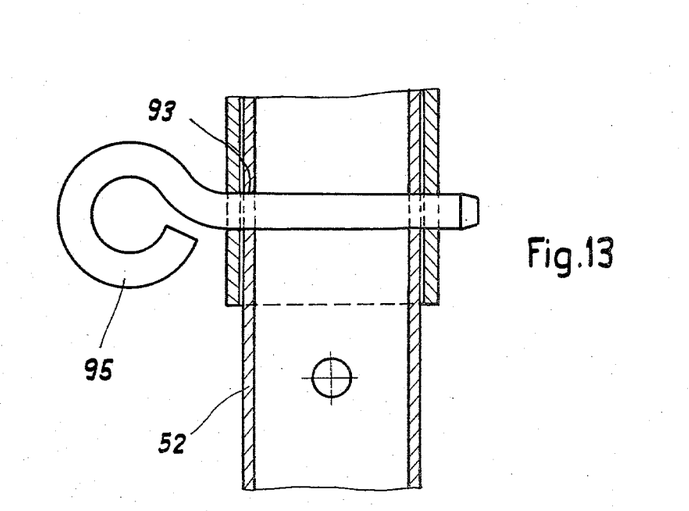
FIG. 13 is a partial longitudinal section through a leg of a bench, which is height-adjustable.

FIG. 13 shows a further version of the invention, of how the bench and the table may be made height-adjustable. Assuming that the furniture will be subjected to relatively large loads, it is advantageous, if those constructional parts, where one part fits into another telescopically, are so formed, that the bolts, as seen in a cross-wise direction, are passed through these constructional parts, so that the whole load is distributed along several shearing surfaces.

Simultaneously, the bearing pressure is received in the direction of two bores. The bolts are aligned in dependence of the location holes in the supporting elements, so that in addition to using a bolt 95, implemented with a hook, an alternative implementation, according to FIGS. 10 and 11, but with an extended bolt portion 76 or 85, may also be utilized.

So that the inner supporting element 52, having a relatively small cross-section, is not unduly weakened by the passage holes 93, these passage holes are displaced along the periphery of the supporting element 52, preferably by respective angles of 90°, and are also disposed along the longitudinal axis of the supporting element 52 at predetermined distances, namely the passage holes 93 are located on a helical line with a steep pitch on the periphery of the supporting element 52.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An assembly adapted for transport on a vehicle and being transformable into furniture, the furniture including at least a table, and a bench,
   comprising in combination:
   a frame including a plurality of tubular elements which may be assembled one to another, to form carrying elements of the table and the bench of said furniture, and
   a transport case, including a cover member therefor doubling as a table top of the table, and first and second groups of plates forming a floor member of said case, said first group of plates doubling as a backrest of said bench, said second group of plates doubling as a sitting portion of said bench.

2. An assembly as claimed in claim 1, wherein said tubular elements comprise first and second groups of elements, elements of the first group being arranged to telescope within corresponding elements of the second group, respectively.

3. An assembly as claimed in claim 1, wherein said frame has at least four corner portions releasably connectable to the vehicle, and wherein said tubular elements include at least four crossbars, two crossbars each releasably linking two respective corner portions to one another, so as to form respective frame end-portions, and two connecting bars for releasably linking said frame end-portions to one another.

4. An assembly as claimed in claim 3, wherein said corner portions, said crossbars, and said connecting bars define a plane extending substantially parallel to said floor.

5. An assembly as claimed in claim 3, wherein each of said corner portions comprises a longitudinal strut and outer and inner cross-struts secured to said longitudinal strut near respective end portions thereof.

6. An assembly as claimed in claim 5, wherein said outer cross-strut has a length exceeding the length of said inner cross-strut.

7. An assembly as claimed in claim 5, wherein the inner width of each of said struts exceeds the outer width of said bars.

8. An assembly as claimed in claim 5, wherein each of said cross-struts has at least one aperture near its ends, said aperture communicating with a threaded bore in a corresponding cross-strut.

9. An assembly as claimed in claim 8, wherein said aperture is a through-going hole.

10. An assembly as claimed in claim 8, wherein said aperture is a slot extending along the longitudinal axis of said cross-strut.

11. An assembly as claimed in claim 5, wherein each of said longitudinal struts has at least one aperture near its free end, and wherein each of said connecting bars is formed with at least one threaded bore near each of its ends, said aperture in said longitudinal strut communicating with a threaded bore in a corresponding connecting bar.

12. An assembly as claimed in claim 11, wherein said aperture in said longitudinal strut is a through-going hole.

13. An assembly as claimed in claim 11, wherein said aperture in said longitudinal strut extends along the longitudinal axis of said longitudinal strut.

14. An assembly as claimed in claim 8 or 11, further comprising additional apertures in each of said bars, each of said additional apertures being offset by about 90° on the periphery of a corresponding one of said bars from an adjoining aperture, said apertures being spaced at respective predetermined distances from one another along the longitudinal direction of the corresponding bar.

15. A transport assembly as claimed in claim 1, wherein said plates comprise pairs of plates of substantially equal dimensions.

16. An assembly as claimed in claim 1, wherein said plates comprise two outer plates and up to four inner plates.

17. An assembly as claimed in claim 1, wherein said plates comprise at least two pairs of outer plates and one pair of inner plates.

18. An assembly as claimed in claims 16, or 17, wherein each of said inner plates has a thickness exceeding the thickness of each of the outer plates.

19. An assembly as claimed in claim 18, wherein the furniture includes an additional bench, and wherein said outer pair of plates double as sitting portions, and said inner pair of plates double as the backrests of said benches, respectively.

20. An assembly as claimed in claim 16, wherein the furniture includes an additional bench, and wherein said outer plates double as the backrest, and said inner plates double as the sitting portions of said benches, respectively.

21. An assembly as claimed in claim 1, wherein at least one of said members of said transport case is formed with an outer rim on a lower side thereof, and an endless groove spaced at a predetermined distance from said outer rim.

22. An assembly as claimed in claim 1, wherein said transport case includes a third group of plates forming walls thereof, said floor member having a plurality of grooves, said third group of plates being insertable into said grooves, respectively.

23. An assembly as claimed in claim 1, wherein said transport case includes a third group of plates forming walls thereof, and further comprising a plurality of pins extending towards said members of said case, said floor member and said cover member having holes for receiving said pins, respectively.

* * * * *